United States Patent [19]

McDonough

[11] Patent Number: 4,862,936

[45] Date of Patent: Sep. 5, 1989

[54] REMOVABLY MOUNTED TRACTION-ENHANCING DEVICE FOR VEHICLE TIRES

[76] Inventor: John McDonough, 11601 - 4th St. North, St. Petersburg, Fla. 33716

[21] Appl. No.: 180,731

[22] Filed: Apr. 12, 1988

[51] Int. Cl.$^4$ .............................................. B60C 27/04
[52] U.S. Cl. .................................... 152/216; 152/218; 152/225 R
[58] Field of Search ........... 152/213 R, 213 A, 225 R, 152/218, 216, 208

[56] References Cited

U.S. PATENT DOCUMENTS

| | | | |
|---|---|---|---|
| 2,423,759 | 7/1947 | Edwards | 152/225 R |
| 2,598,298 | 5/1952 | Pindjak | 152/225 R |
| 2,655,972 | 10/1953 | Doney | 152/213 R |
| 3,190,335 | 6/1965 | Isaacman | 152/216 |
| 4,089,359 | 5/1978 | Jones | 152/225 R |
| 4,098,314 | 7/1978 | Welsh | 152/216 |

Primary Examiner—Michael W. Ball
Assistant Examiner—Gregory J. Wilber
Attorney, Agent, or Firm—Ronald E. Smith; Joseph C. Mason, Jr.

[57] ABSTRACT

A traction-enhancing device that is releasably attached to vehicle tires. A rigid base member having a central core and plural arms radiating therefrom is placed into overlying relation to the side of a tire. Plural flexible cords and rigid rod members in axial alignment therewith interconnect a like number of tread-overlying road-gripping members to a capstan mounted centrally of the base member. Rotation of the capstan draws the road-contacting members radially inwardly into tight-fitting engagement with the tire and effectively creates an enhanced tread. Counter rotation of the capstan enables the road-contacting members to be swung away from the tread so that the device can be removed from the tire.

19 Claims, 3 Drawing Sheets

REMOVABLY MOUNTED TRACTION-ENHANCING DEVICE FOR VEHICLE TIRES

BACKGROUND OF THE INVENTION

1. Field of the Invention

This invention relates, generally, to devices attachable to vehicle tires to improve their traction in snow and ice.

2. Description of the Prior Art

The tire industry has developed tires especially suited for use in snowy and icy road conditions; such tires are known as snow tires and are generally characterized by deeper and wider treads as compared to the treads of fair weather tires.

The tire industry, recognizing the general inadequacy of snow tires in severe winter conditions, has also introduced tires having metal studs protruding from the tire surface. Such studded tires effectively grip icy roadways, but the entire tire must be removed when non-icy roads are encountered.

Inventors have accordingly developed many devices that are removably attachable to tires so that only the device and not the entire tire need be removed when roads become clear of snow and ice accumulation.

Perhaps the most widely-accepted innovation in this field of invention is the well-known arrangement of chains that may be wrapped around tires to increase their traction. Chains, though effective, are heavy and not easily installed. Motorists have been known to shun the chore of installing chains even when road conditions virtually mandated their use. Inventors have, therefore, sought alternative to chains.

Examples of devices that have been developed to overcome the limitations of chains are shown in the following U.S. Pat. Nos.:

| U.S. Pat. No. | Inventor | Issue Date |
| --- | --- | --- |
| 4,089,359 | J. J. Jones | May 16, 1978 |
| 3,891,018 | E. Hyggen | June 24, 1975 |
| 3,190,335 | M. Isaacman | June 22, 1965 |
| 2,873,783 | M. O'Higgins | February 17, 1959 |
| 2,767,761 | M. O'Higgins | October 23, 1956 |
| 2,730,406 | G. C. Fitzgerald | January 10, 1956 |

Although the traction-enhancing devices of the prior art fulfill their intended purposes, they do so in a complex manner, i.e., the devices are mechanically complicated and as such are expensive to manufacture. The high manufacturing costs have resulted in high retail prices, which in turn have prevented the devices from gaining widespread acceptance in the marketplace.

There is a need for a quickly attachable and removable traction-enhancing device of elegant, low cost construction, but the prior art neither teaches nor suggests how the needed device could be constructed.

SUMMARY OF THE INVENTION

The long standing but heretofore unfulfilled need for a traction-enhancing device of simple construction is now provided in the form of a spider-shaped, rigid base member that serves as a mounting means for a plurality of radially disposed, flexible cord and rigid rod members that are axially aligned with one another and the latter of which has traction-enhancing devices pivotally mounted to their respective radially outermost ends.

A capstan member is rotatably mounted at the center of the base member; all of the cord members have their radially innermost ends fixedly secured to the capstan so that rotation of the capstan causes the outermost ends of the cords to travel radially inwardly.

The radially outermost end of each cord is secured to a connecting means in the form of an elongate metallic rod; each rod, in turn, is secured to a "U"-shaped mounting means for a road-contacting, traction-enhancing device having a very rough, ice-engaging surface formed thereon. Each traction-enhancing device has a smooth, tire tread-contacting rear surface that overlies the tread portion of the tire.

The device is installed when the cord members are fully radially extended, i.e., when the capstan is unwound. The spider-shaped base member is centered with respect to the tire's sidewalls and the traction-enhancing devices are positioned as desired about the circumference of the tire. The capstan is rotated by a suitable device and such rotation tightly secures the respective smooth rear surfaces of the traction-enhancing devices to the tread portion of the tire, in overlying relation thereto, and the vehicle may then be driven safely over slick roads.

A reverse rotation of the capstan loosens the tight fit between the traction-enhancing devices and the tire tread so that said devices can be rotated 90° do that they no longer tightly abut the tire. The spider may be removed to a storage location such as a vehicle trunk until needed again.

The primary object of this invention is to provide a road safety device that will reduce vehicle collisions and single car mishaps on snowy and icy roads.

A closely related object is to provide such a road safety device in a simply-constructed form so that it will be readily affordable by anyone who can afford private transportation.

Another object of this invention is to provide a device that is so quickly attachable and removable that it will be used whenever required.

The invention accordingly comprises the features of construction, combination of elements and arrangement of parts that will be exemplified in the construction hereinafter set forth and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

Similar reference numerals refer to similar parts throughout the several views of the drawings.

DETAILED DESCRIPTION OF THE PREFERRED EMBODIMENT

Figure 1:
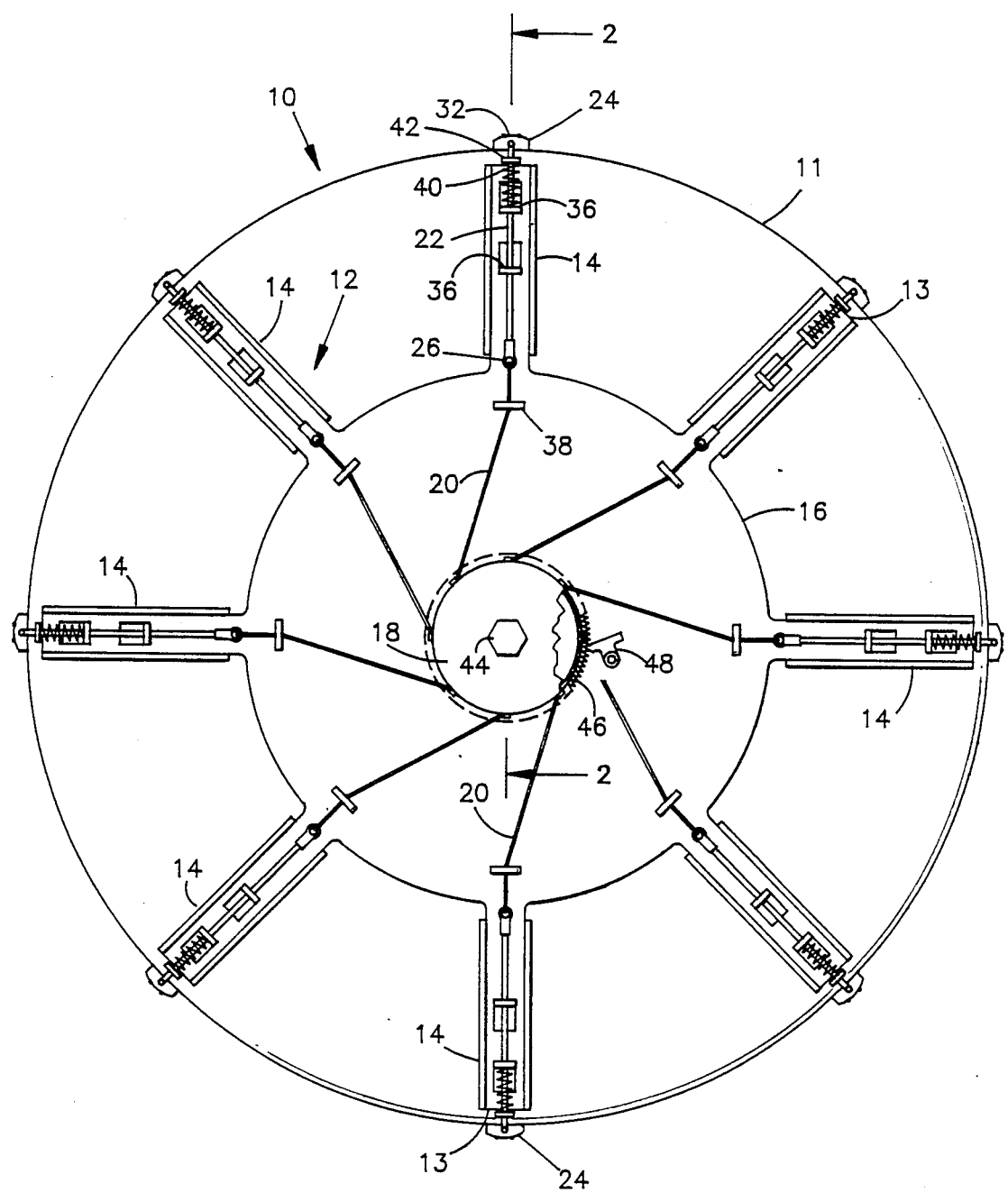
FIG. 1 is a side elevational view of the novel device, shown in its overlying relation to a tire.

Referring now to FIG. 1, it will there be seen that an embodiment illustrative of the invention is denoted as a whole by the reference numeral 10.

The device 10, to be known commercially as the Snow Spider, includes a substantially rigid base member 12 which has arm members, collectively designated 14, radiating from a central core 16. The number of arm members 14 may vary from embodiment to embodiment, but the preferred number of arm members 14 is eight. Arms 14 are of equal length and are equidistantly and circumferentially spaced relative to one another as shown.

In use, device 10 overlies the side of a tire 11 as shown in FIG. 1 and is centered with respect thereto. The diameter of an imaginary circle coincident with the radially outermost ends 13 of arms 14 will be slightly less than the diameter of the tire so that the arms 14 will abut the side walls of the tire as shown.

Figure 2:
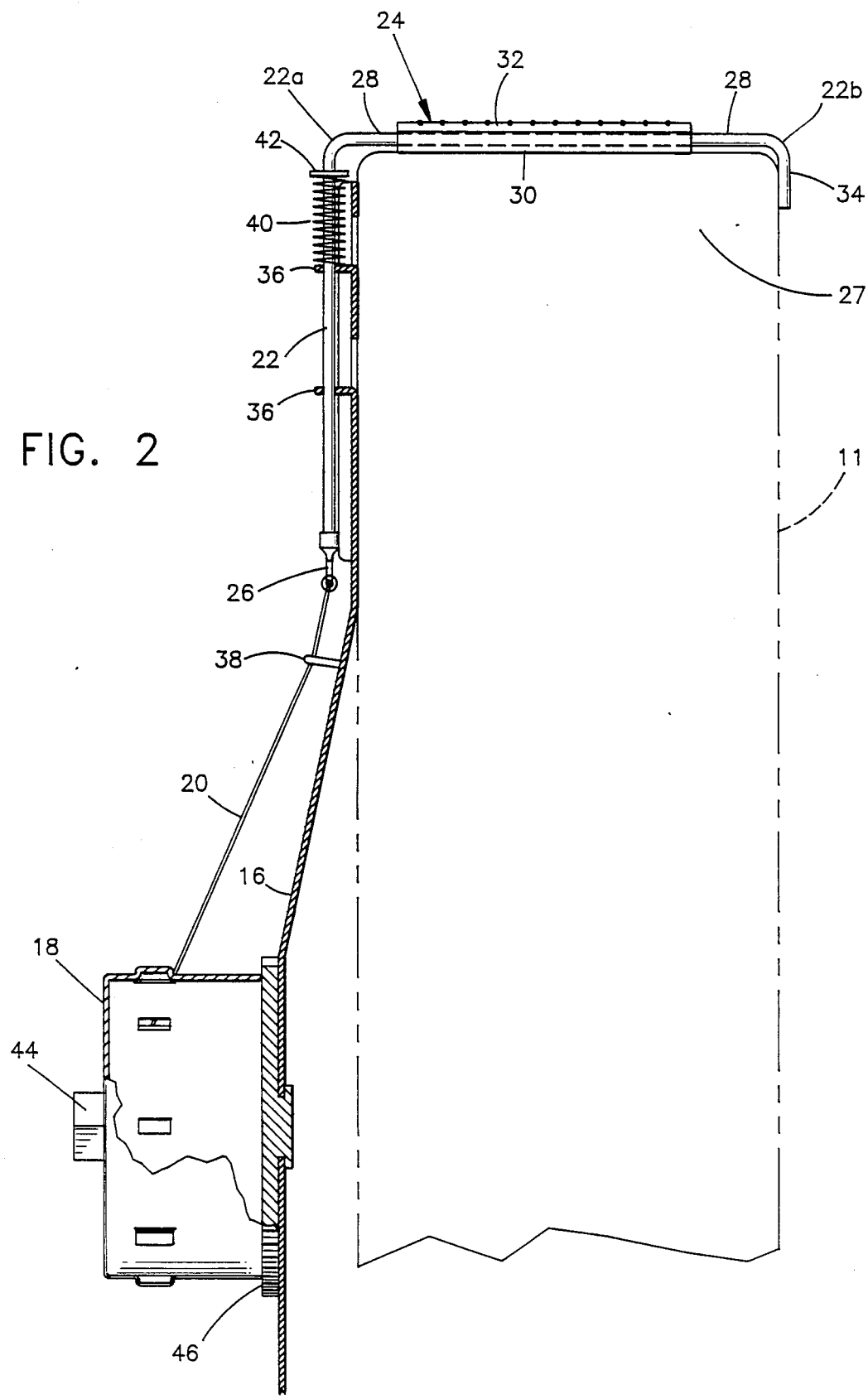
FIG. 2 is a sectional view taken along line 2—2 of FIG. 1.

Central core 16 is somewhat dome-shaped frusto conical as perhaps best shown in FIG. 2, so that it may overlie the hub area of the tire to which the Snow Spider 10 is to be attached.

Figure 3:
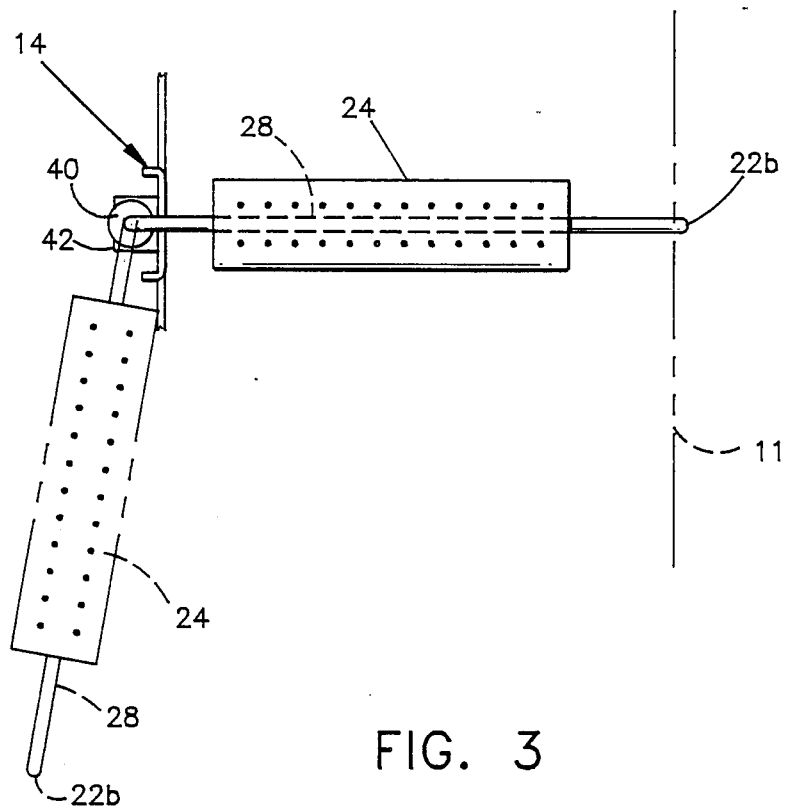
FIG. 3 is a top plan view of a traction-enhancing device overlying a tire tread.

The tire-contacting or inner face of each arm 14 is flared upwardly, as perhaps best shown in FIG. 3, so as not to rub the tire's sidewall in a detrimental way. In other words, each arm 14 is generally "U"-shaped in transverse section along its extent.

Capstan 18 (FIGS. 1 and 2) is rotatably mounted at the center of core 16. The radially innermost ends of each flexible cord member 20 may be tied or otherwise fixedly secured to the capstan by suitable means as shown, or alternatively, the number of cord members 20 may be halved and the medial portion of each cord member may pass through a bore means formed in capstan 18.

Rotation of the capstan thus causes the radially inward portions of the respective cord members 20 (or, alternatively, their medial portions) to wrap around said capstan 18. Such wrapping effects simultaneous radially inward travel of the radially outermost ends of the cord members.

An elongate rigid linkage means in the form of a rod member 22 of suitable material extends between each cord's radially outermost end and a traction-enhancing member 24. The radially outermost end of each cord 20 is fixedly secured to an eyelet means 26 that is integral to each rod member 22 at its radially innermost end as shown.

Each rod member 22 is bent as at 22a and 22b (FIG. 2) at its radially outermost region to form a shallow, "U"-shaped, tire-receiving cradle means 27. Thus, each rod member is integrally formed with its tire receiving cradle means to which cradle means the traction-enhancing members 24 are secured.

A linear portion 28 of each rod 22 interconnects bent portions 22a, 22b and provides the base to which traction-enhancing members 24 are secured.

Thus, each cord member 20 and its associated rod member 22 form an interconnecting means that extends between capstan 18 and road-engaging member 24. Each interconnecting means accordingly has a rigid radially outward portion (rod member 22) and a flexible radially inward portion (cord member 20).

Each traction-enhancing member 24 of which there are eight (8) in the illustrated embodiment, has a flat, tire-contacting rear surface 30 that overlies and tightly abuttingly engages the treaded surface of tire 11 when device 10 is properly installed on the tire, and a forward, ice-engaging surface 32 that may be spiked as shown in FIGS. 2 and 3.

Each traction-enhancing member 24 is thus understood to lie in a plane orthogonal to the plane of spider member 10 when the novel apparatus is operatively installed on a tire.

The length of rod medial portion 28 is selected so that the distal free end 34 of rod 22 engages the inner surface of a tire, as shown in FIGS. 2 and 3, when capstan 18 is rotated in a counterclockwise direction.

When it is desired to remove device 10, capstan 18 is rotated clockwise to release the radially-inwardly-directed force appearing on each rod 22 and flexible cord 20. Due to the axial alignment of each cord 20 and its associated rod 22 and the interconnection thereof at eyelets 26, each traction-enhancing member 24 may be disengaged from its tire-gripping position and rotated 90° so that it lies in the plane of spider member 12, as shown in phantom lines in FIG. 3. This frees end 34 of rod 22 from its grip of the tire's inner surface so that the Snow Spider 10 can be separated from the tire.

Having completed a general overview of the inventive device, a closer examination of the device can now be undertaken.

Each rigid rod member 22 is slidably mounted in its operable position by a pair of longitudinally spaced, upstanding, axially aligned, apertured bracket members 36 which may be stamped from base member 12 or which may be provided in the form of "L"-shaped bracket members which are individually welded or otherwise secured to base 12.

Similarly, each flexible cord means 20 is slidably mounted in its operative position by an eyelet or cord guide means 38 that is similarly stamped from or otherwise secured to base member 12. Each cord guide means 38 is longitudinally spaced from and aligned with the rod-receiving brackets or rod guide means 36.

A coiled spring means 40 is positioned radially outwardly of the outermost one of each pair of rod guide means 36 and is disposed in surrounding relation to each rod member 22 radially inwardly of the bend 22a formed in said rod member. A stop member 42 is centrally apertured and is fixedly secured to its associated rod 22 as shown and cooperates with its associated bracket member 36 and said associated rod member 22 to capture said spring member so that radially inward travel of rod 22 loads spring 40. In this manner, some play is introduced into the mechanism so that all traction-enhancing members 24 can be securely positioned even if one or more of said members 24 enters into its final tightened position before or after the other members 24.

Moreover, when it is desired to remove the device 10 by loosening the grip between flat surface 30 of traction-enhancing device or gripper device 24 and the tire's surface, which loosening is effected in part by clockwise rotation of capstan 18, the load on spring 40 will drive stop member 42 in a radially outward direction of travel to enable disengagement from the inner side of the tire of distal free end 34 of rod 22 so that rod 22 and gripping means 24 carried thereby can be rotated 90°, as shown in FIG. 3, to complete the device-removal operation.

Capstan 18 is surmounted by nut 44; nut 44 is engageable by a suitable tool and said nut and capstan are integrally formed or otherwise interconnected so that tool-effected rotation of nut 44 effects to simultaneous and corresponding rotation of capstan 18.

A rotatably mounted sprocket gear 46 is positioned contiguous to capstan 18, at the base thereof as shown. Sprocket gear 46 and capstan 18 are integrally formed or fixedly secured to one another.

A pivotally mounted, biased pawl means 48 bears against the teeth of gear member 46 at all time and stops spring-imparted clockwise rotation thereof.

When it is desired to remove device 10 from its operative position relative to a tire, capstan 18 is rotated a small amount in a counterclockwise direction to release the stress on pawl means 48; such pawl means is then easily pivoted away so that it no longer serves as a stop means and spring members 40 will drive their associated rod members 22 in a radially outward direction, and allows disengagement of gripper members 24 as aforesaid.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of this invention herein described, and all statements of the scope of the invention which, as a matter of language, might be said to fall therebetween.

Now that the invention has been described, What is claimed is:

1. A removably mounted device for enhancing the traction of tires with respect to icy road surfaces, comprising:

a substantially rigid base member;
 said base member including a central core;
 said central core having a diameter about equal to a hub region of a tire;
 said central core having a frusto-conical configuration to provide clearance between said central core and said hub region of a tire;
 a plurality of elongate arm members in fixed position relative to said central core and disposed radiating outwardly from said central core at equidistantly spaced intervals;
 said arm members having a common length so that a diameter of an imaginary circle coincident with the radially outermost ends of said arm members is slightly less than a diameter of a vehicle tire;
 a rotatably mounted capstan member disposed at the center of said central core;
 each of said arm members having a radial extent equal to about one half the diameter of said central core;
 each of said arm members being disposed in a common plane normal to the axis of rotation of said tire;
 said central core having a flat central portion to which said capstan member is mounted;
 said flat central portion being disposed in a plane parallel to said common plane of said arm members, said plane of said flat central portion being spaced a predetermined distance from said common plane of said arm members;
 a clearance space defined by said predetermined distance that separates said central core from said hub region of a tire;
 said flat central portion of said central core and radially innermost ends of said arm members being integral to one another, there being an angularly disposed major portion of said central core extending between said flat central portion of said central core and said radially innermost ends of said arm members so that the amount of clearance space between said central core and said hub region is greatest at a central portion of said hub region and diminishes along the radial extent of said hub region;
 a plurality of elongate flexible cord members each having its radially innermost end fixedly secured to said capstan member;
 a plurality of elongate rigid rod members each having its radially innermost end fixedly secured to a radially outermost end of one of said flexible cord members;
 there being as many rod members and cord members as there are arm members;
 a plurality of traction-increasing members;
 each traction-increasing member having a flat, rearward surface to overlie and tightly abuttingly engage a tread surface of a tire and a forward roughened surface that abrades and grips an icy road surface;
 each of said traction-increasing members being fixedly secured to an associated rod member;
 each of said rod members having a first bend formed therein to position said rearward surface of its associated traction-increasing member in overlying relation to said tread surface;
 each of said rod members having a second bend formed therein to engage an inner side of a tire to which said device is releasably mounted;
 a bias means for biasing each of said rod members and said cord members radially outwardly;
 said capstan member being biased by said bias means so that it is loaded when rotated;
 a ratchet and pawl means that prevents unloading of said capstan member when it has been rotated in one direction; and
 rotation of said capstan member in said one direction effecting generally radially inward travel of said cord members and radially inward travel of said rod members and hence of said traction-increasing members.

2. The device of claim 1, wherein said arm members are "U"-shaped in transverse section along their respective extents so that edges of said arm members do not abrade said tire.

3. The device of claim 1, further comprising a first plurality of guide means for maintaining the respective radial dispositions of each of said cord members.

4. The device of claim 3, further comprising a second guide means for maintaining the respective radial dispositions of each of said rod members.

5. The device of claim 4, wherein said first and second guide means are apertured bracket members axially aligned with one another and which slidably receive their associated cord and rod members.

6. The device of claim 1, wherein eight arm members radiate from said central core at 45° intervals.

7. A device having eight radially disposed arm members of equal length such that a diameter of an imaginary circle coincident with the radially outermost ends of said arm members is slightly less than a diameter of a vehicle tire, said device having eight traction-enhancing devices circumferentially spaced about and disposed in overlying relation to a tread carrying portion of said tire, each of said traction-enhancing devices being positioned radially outwardly of said arm members, in axial alignment therewith, a capstan means, eight flexible cord members secured at their respective radially innermost ends to said capstan means and being coilable around said capstan means when said capstan means is rotated about its axis of rotation, eight rigid rod members interconnecting said cord members and said traction-enhancing devices and mounted on said arm members, said arm members being integrally formed with a central core means, said capstan means being centrally disposed with respect to said central core means, said central core means having a generally convex configuration, a clearance space for a hub portion of said tire being provided by said configuration of said central core means, said central core means having a diameter about equal to said hub portion of said tire, and each of said arm members having a radial extent about one-half the diameter of said central core.

8. The device of claim 7, where radially outermost ends of said arm members are flared away from a tire underlying said arm members to avoid abrasion of said tire by edges of said arm members.

9. The device of claim 8, wherein rod guide means and cord guide means are mounted at longitudinally spaced intervals along the extent of said arm members, and wherein said guide members are centrally apertured to slidably receive said rod and cord members respectively.

10. The device of claim 9, wherein bias means are provided to bias said traction enhancing devices radially outwardly.

11. A plurality of traction-enhancing, road-engaging members disposed at equidistantly spaced intervals about and in overlying relation to the road-contacting surface of a tire, a base member to which said road-engaging members are connected, a capstan means mounted centrally of said base member, interconnecting means interconnecting said road-engaging members and said capstan means such that rotation of said capstan means effects radially inward travel of said road-engaging members and hence tightening of said road-engaging members with respect to said road-contacting surface of said tire, said base member having a bulbous central core, said interconnecting means including a radially inward flexible portion secured to said capstan means and wrapable therearound and a rigid radially outward portion that is integral to each of said road-engaging members, a plurality of rigid arm members radiating from said bulbous central core, said arm members lying in a common plane normal to the axis of rotation of said tire, each of said arm members having a length equal to about one-half the diameter of said central core, a clearance space being provided by said bulbous configuration of said central core between a hub region of said tire and said central core, said arm members having radially outermost ends that overlie an outer sidewall of a tire when juxtaposed thereto, and said arm members having edges that flare away from said tire sidewall to avoid abrading said sidewall.

12. The device of claim 11, wherein the rigid radially outward portion of said interconnecting means are elongate rod members each of which has an eyelet at its radially innermost end, and to which eyelet is secured the radially outermost end of said interconnecting means flexible portion.

13. The device of claim 12, wherein at least one apertured bracket member is fixedly secured to each of said arm members and wherein each rod member is slidably received through its associated aperture.

14. The device of claim 13, wherein a stop member is fixedly secured to each of said rod members at a point radially outwardly from said bracket member, and wherein a bias means is maintained in loaded configuration between said bracket member and said stop member to urge said rod member in a radially outward direction.

15. The device of claim 14, wherein the radially outermost end of each of said rod members carries said road-engaging member and wherein each said rod member is bent at a first angle to position said road-engaging device in overlying relation to the road-contacting portion of said tire and at a second angle so that the distal end thereof grips the inner sidewall of a tire.

16. The device of claim 15, wherein at least a second apertured bracket member is fixedly secured to each of said arm members and wherein said interconnecting means flexible portion is slidably received through said aperture.

17. The device of claim 16, wherein said road-engaging members are eight in number to ensure essentially continuous and uninterrupted engagement between said road-engaging members and a road surface.

18. The device of claim 11, wherein said road-engaging members are rotatable to a non-tire-engaging position about an axis defined by said interconnecting means when said road-engaging members are not biased radially inwardly by said capstan.

19. The device of claim 11, wherein the radially outer end of each of said rod members is generally "U"-shaped to receive and retain the road-contacting portion of a tire therein.

* * * * *